(12) United States Patent
Lai et al.

(10) Patent No.: US 7,706,264 B2
(45) Date of Patent: Apr. 27, 2010

(54) MOBILE VOIP PHONE COMMUNICATION SYSTEM AND METHOD HAVING A DIALING PROCESS THAT UTILIZES A LOCAL MOBILE VOIP SERVER IN THE SAME ZONE AS A CALLING MOBILE VOIP PHONE

(75) Inventors: Sun-Loi Lai, Taipei (TW); Shih-Hsiung Weng, Taipei (TW)

(73) Assignee: Inventec Multimedia & Telecom Corporation, Taipei (TW)

( * ) Notice: Subject to any disclaimer, the term of this patent is extended or adjusted under 35 U.S.C. 154(b) by 914 days.

(21) Appl. No.: 11/509,145

(22) Filed: Aug. 23, 2006

(65) Prior Publication Data
US 2006/0285492 A1    Dec. 21, 2006

(51) Int. Cl.
*G01R 31/08* (2006.01)
(52) U.S. Cl. .................................... 370/230
(58) Field of Classification Search .............. 455/456.1, 455/456.6, 435.1; 370/351, 352, 353, 356, 370/230
See application file for complete search history.

(56) References Cited

U.S. PATENT DOCUMENTS

| | | | |
|---|---|---|---|
| 6,603,761 B1 * | 8/2003 | Wang et al. ................. | 370/352 |
| 7,388,490 B2 * | 6/2008 | Freitag et al. ............ | 340/572.1 |
| 2003/0144013 A1 * | 7/2003 | Benchetrit et al. .......... | 455/461 |
| 2005/0213716 A1 * | 9/2005 | Zhu et al. ..................... | 379/45 |

* cited by examiner

*Primary Examiner*—Kwang B Yao
*Assistant Examiner*—Anh Ngoc Nguyen
(74) *Attorney, Agent, or Firm*—Peter F. Corless; Steven M. Jensen; Edwards Angell Palmer & Dodge LLP

(57) ABSTRACT

A mobile Voice-over-Internet-Protocol (VoIP) phone communication system and method allows users to make mobile communication via mobile VoIP phones. A local mobile VoIP server is established in at least one specific communication zone and at least a central mobile VoIP server for coordinating the local mobile VoIP server in each zone is established. The mobile VoIP phone logins to the local mobile VoIP server in a specific communication zone to which the mobile VoIP phone enters, so the local mobile VoIP server identifies the mobile VoIP server in the zone and stores identification information of the identified mobile VoIP phone. If the mobile VoIP phone moves from a first specific communication zone to a second specific communication zone, the identification information of the mobile VoIP phone is recorded in the local mobile VoIP server in the second specific communication zone and the local mobile VoIP server transmits the identification information to a central mobile VoIP server, such that the central mobile VoIP server stores the identification information.

23 Claims, 7 Drawing Sheets

MOBILE VOIP PHONE COMMUNICATION SYSTEM AND METHOD HAVING A DIALING PROCESS THAT UTILIZES A LOCAL MOBILE VOIP SERVER IN THE SAME ZONE AS A CALLING MOBILE VOIP PHONE

FIELD OF THE INVENTION

The present invention relates to a Voice-over-Internet-Protocol (VoIP) technology, and more particularly, to a mobile VoIP phone communication system and method combining wireless communication technology and the VoIP technology to allow users to use VoIP phones to transmit data while on the move.

BACKGROUND OF THE INVENTION

VoIP (Voice-Over-Internet-Protocol) offers a revolutionary way of communication that uses Internet to transfer voices in order to provide conversation over two (or more than two) parties. As technology evolves and Internet in applications of everyday life is more and more pervasive, transmitting voice data using this network backbone and its special Internet Protocol (IP) is not an issue anymore.

In addition, with the pervading of Internet and reduction of relevant cost, acquiring an VoIP phone becomes easier. In Taiwan, since the communication cost over Internet is typically three to five times cheaper than that of using a traditional telephone line, VoIP phone is the best option for saving cost for companies, families and individuals, especially when making long-distance calls.

However, voice quality of the VoIP phones is a technical bottleneck. Since the audio signal of the VoIP phones is compressed, its communication quality depends on the audio encoding/decoding scheme used. The higher the compression ratio, the less bandwidth is required, but the audio quality is compromised such that the quality is not as clear as that of a traditional phone. As a result, notwithstanding the cost of VoIP phone being much cheaper than a traditional phone, VoIP phone lacks a soaring market growth. In light of this, International Telecommunication Union (ITU) has set forth G.723.1 and G.729A standards that provides improvement of the communication quality for VoIP phones. Consequently, the number of people using VoIP phones in recent years has experienced a substantial growth. The VoIP phone market all over the world is increasing. "Financial Times" in British has reported that according to the estimation of a research institute In-Stat/MDR the number of people using the VoIP phones in the U.S. will quickly increase from 0.38 million this year to 4 millions in year local mobile VoIP server 2007.

Nonetheless, a bottleneck in the development of the VoIP phones is still present. Although the VoIP phones offer the possibility of transmission over computer-to-computer, computer-to-phone and phone-to-phone, it is still not capable of providing mobile communication, which greatly limits its popularity in today's world where mobile communication is being pursued.

SUMMARY OF THE INVENTION

In light of forgoing drawbacks, an objective of the present invention is to provide a mobile VoIP phone communication system and method, allowing users to use VoIP phones while moving, thus solving the problem of fixed-point transmission/conversation of traditional VoIP phones.

Another objective of the present invention is to provide a mobile VoIP phone communication system and method for displaying the locations of the parties in communication that allows the users to know the location of the other party, which is particularly useful in emergency situation.

In accordance with the above and other objectives, the present invention provides a mobile VoIP phone communication system and method. The mobile VoIP phone communication system of the present invention includes: at least a mobile VoIP phone that sends identification information via a network unit; at least a local mobile VoIP server located in a specific communication zone that establishes a network connection with the mobile VoIP phone via the network unit and identifies and records identification information of a mobile VoIP phone entering into the zone; and at least a central mobile VoIP server that establishes network communication with the local mobile VoIP server via the network unit to coordinate the local mobile VoIP server in each zone and obtains identification information of all the mobile VoIP phones via the local mobile VoIP server in each zone so as to allow communication between various mobile VoIP phones.

The mobile VoIP phone further includes a receiving module for handling a communication packet received by the mobile VoIP phone; a transmitting module for handling a communication packet to be sent by the mobile VoIP phone; a storage module for storing processing status of the receiving module and the transmitting module for allowing the local mobile VoIP server in the specific communication zone to identify the current status of the mobile VoIP phone in the zone; and a display module for displaying a location corresponding to a process status selected from one of a communication source location received by the receiving module and a communication packet destination location to be transmitted by the transmitting module.

The mobile VoIP phone communication method of the present invention allowing users to make mobile communication via mobile VoIP phones, the method comprising the following steps of: establishing a local mobile VoIP server in at least one specific communication zone; establishing at least a central mobile VoIP server for coordinating the local mobile VoIP server in each zone; allowing the mobile VoIP phone to login to the local mobile VoIP server in a specific communication zone to which the mobile VoIP phone enters, such that the local mobile VoIP server identifies the mobile VoIP server in the zone and stores identification information of the identified mobile VoIP phone, if the mobile VoIP phone moving from a first specific communication zone to a second specific communication zone, the identification information of the mobile VoIP phone being recorded in the local mobile VoIP server in the second specific communication zone; and allowing the local mobile VoIP server to transmit the identification information to a central mobile VoIP server and the central mobile VoIP server storing the identification information.

In summary, the mobile VoIP phone communication system and method of the present invention essentially assigns an identification code to each mobile VoIP phone and logins the phone into a local mobile VoIP server in which it is currently resides using the identification code based on abovementioned registration process. The mobile VoIP phone in a zone dynamically sends its current location to the local mobile VoIP server in that zone. When the location packet sent by the mobile VoIP phone is different from that of the local mobile VoIP server, the mobile VoIP phone then performs the location update process in order to dynamically update its location. Thereafter, the local mobile VoIP server sends the identification code of the updated mobile VoIP phone to the central mobile VoIP server. Thus, when a user wishes to make a call to this identification code, data transmission with the mobile VoIP phone with this identification code can be provided via the central mobile VoIP server and the local mobile VoIP server.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE EMBODIMENTS

The present invention is described by the following specific embodiments. Those with ordinary skills in the arts can readily understand the other advantages and functions of the present invention after reading the disclosure of this specification. The present invention can also be implemented with different embodiments. Various details described in this specification can be modified based on different viewpoints and applications without departing from the scope of the present invention.

Figure 1:
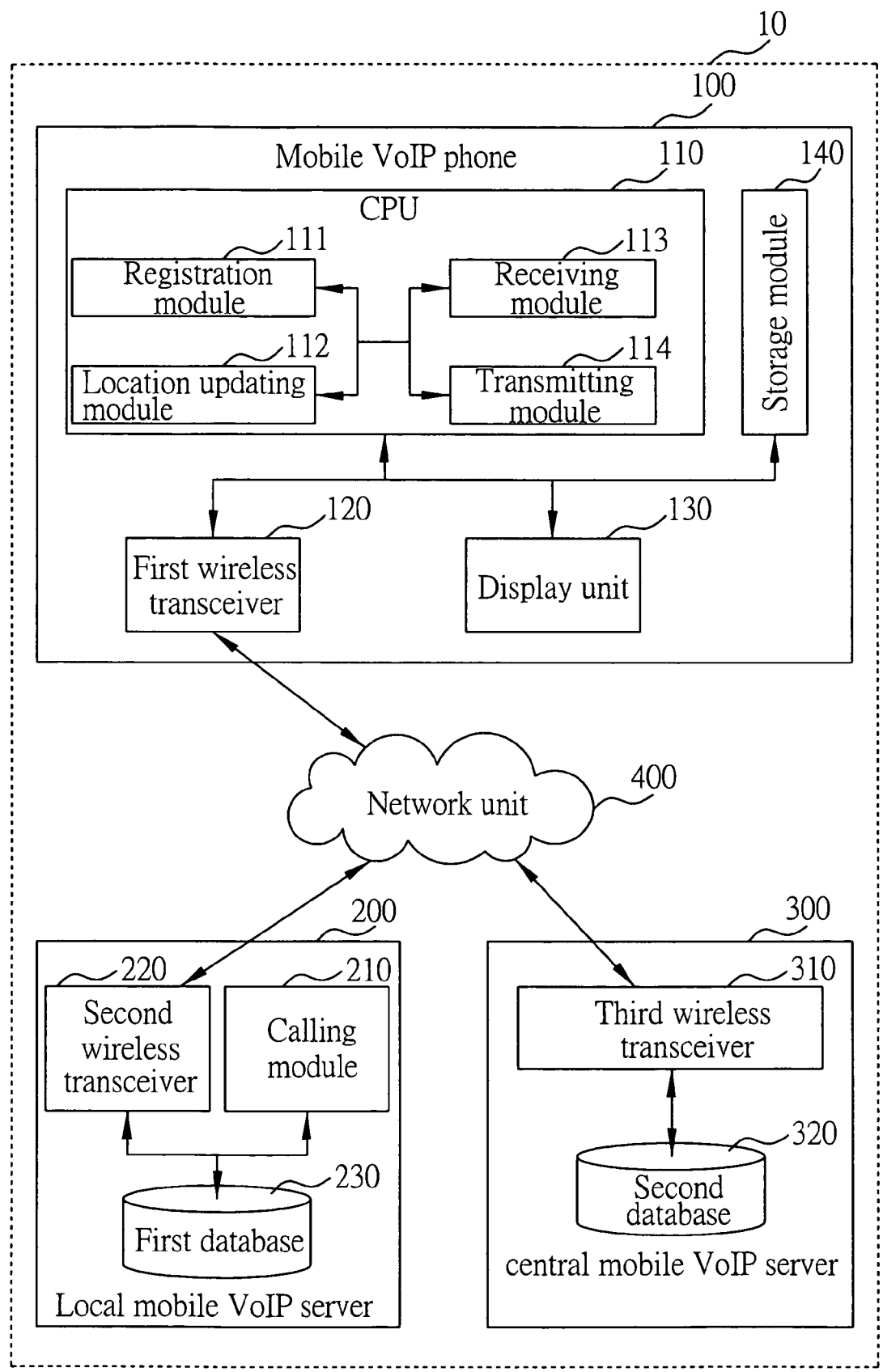
FIG. 1 is a schematic block diagram depicting a mobile VoIP phone communication system of the present invention.

FIG. 1 is a schematic block diagram depicting a mobile VoIP phone communication system of the present invention. As shown, the mobile VoIP phone communication systems 10 of the present invention includes: a mobile VoIP phone 100, a local mobile VoIP server 200 and a central mobile VoIP server 300. The mobile VoIP phone 100 further includes a central processing unit (CPU) 110, a first wireless transceiver 120, a display module 130 and a storage module 140. The local mobile VoIP server 200 comprises a calling module 210, a second wireless transceiver 220 and a first database 230. The central mobile VoIP server 30 comprises a third wireless transceiver 310 and a second database 320. The local mobile VoIP server 200 is located in a specific communication zone for identifying which mobile VoIP phone 100 enters into its zone and recording the identified mobile VoIP phone 100 in the first database 230. In other words, a different communication zone has its own local mobile VoIP server 200. It should be noted that the numbers of the mobile VoIP phone 100, the local mobile VoIP server 200 and the central mobile VoIP server 300 are not limited to those shown in FIG. 1, but can be more than two depending on actual implementations.

The CPU 110 comprises a registration module 111, a location updating module 112, a receiving module and a transmitting module 114. The registration module 11 is used for login the mobile VoIP phone 100 into the local mobile VoIP server 200, such that other users may connect to this mobile VoIP phone 100 via the local mobile VoIP server 200 for data transmission. The location updating module 112 is used to handle the location update of the mobile VoIP phone 100, that is, when the latest location packet transmitted by the mobile VoIP phone 100 is different from that of the local mobile VoIP server 200, the location updating module 112 immediately updates the current location in the latest location packet recorded by the mobile VoIP phone 100. The receiving module 113 is used to handle the communication packets, for example, sent from another mobile VoIP phone (not shown, i.e. in a transmitting end) received by the mobile VoIP phone 100 (i.e. the mobile VoIP phone 100 is in a status of receiving call or data). The transmitting module 114 is used to handle communication packets sent by the mobile VoIP phone 100 to another mobile VoIP phone (not shown, i.e. in a receiving end), so the mobile VoIP phone 100 is in a status of receiving calls, dialing, or transmitting data.

The first wireless transceiver 120 is used to decode a radio wave received into packets or encode packets into a radio wave for the mobile VoIP phone 100. All the packets transmitted or received by the mobile VoIP phone 100 will be processed by the first wireless transceiver 120. The first radio transceiver 120 also provides continuous communication with the local mobile VoIP server 200 in a specific communication zone. The purpose of this communication is for the local mobile VoIP server 200 in the specific communication zone to identify the mobile VoIP phone 100 resides in its specific zone and for the mobile VoIP phone 100 to determine which communication zone it is currently in. Then, the location updating module 112 may update the location of the mobile VoIP phone 100 accordingly. In other words, when the mobile VoIP phone 100 moves from one specific communication zone to another, the location recorded by the mobile VoIP phone 100 can be updated, so as to allow the mobile VoIP phone 100 to communication and transmit data with another communication device (e.g. another mobile VoIP phone) even if the specific communication zone is changed. The display module 130 (e.g. a liquid crystal display) is used to show the current location of the mobile VoIP phone 100 as well as the location of the other party currently in communication.

The storage module 140 is used to store the communication status of the mobile VoIP phone 100 (i.e. the status of the receiving module 113 and the transmitting module 114 of the mobile VoIP phone), which allows the local mobile VoIP server 200 in the specific communication zone to identify whether the mobile VoIP phone 100 in its zone is now in a communicating or calling session. If the mobile VoIP phone 100 is in a communication status of communicating or calling session (i.e. a busy status such as receiving/making a call or transmitting data), a calling flag is set to be "1", that is, a "TRUE" status value to indicate that the mobile VoIP phone 100 has already started a calling session or is performing a communication process. Additionally, the storage module 140 may store data associated with operating processes according to operating conditions of the mobile VoIP phone 100, for example, data sent from the local mobile VoIP server 200 or data to be sent by the mobile VoIP phone 100.

The local mobile VoIP server 200 handles all the mobile VoIP phone mobile VoIP phones 100 currently in its zone or previously were in its zone and connects to the central mobile VoIP server 300 via a network unit 400 such as Internet.

The calling module 210 is used to handle a call initialization process for connecting two mobile VoIP phone mobile VoIP phones 100 in a calling session.

The second wireless transceiver 220 is used to handle communication and data transmission of a mobile VoIP phone 100 with another communication device.

The first database 230 is used to store the identification code and the location of each mobile VoIP phone 100 in the zone.

The central mobile VoIP server 300 is the main mobile VoIP server for coordinating the local mobile VoIP server local mobile VoIP servers 200 in various zones.

The third wireless transceiver 310 is used to handle communication and data transmission between a mobile VoIP phone 100 with another communication device in a different communication zone. The central mobile VoIP server 300 obtains identification data of all the mobile VoIP phone mobile VoIP phones 100 through the local mobile VoIP server local mobile VoIP servers 200 located in different communication zones.

The second database 320 is used to store the identification codes and locations of all the valid mobile VoIP phone mobile VoIP phones 100 received from the each local mobile VoIP server 200.

Figure 2:
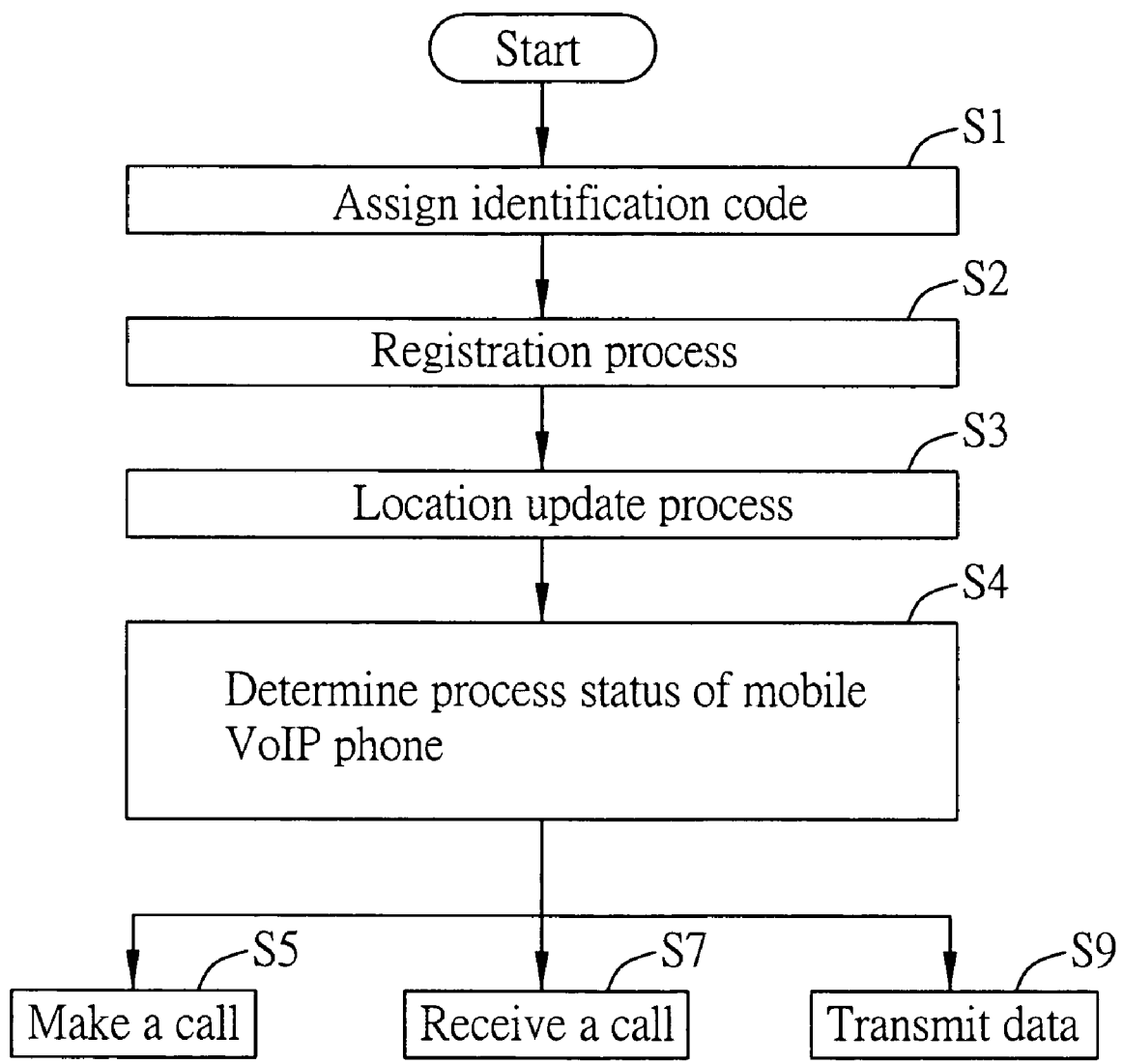
FIG. 2 is a flowchart illustrating the method of mobile VoIP phone communication of the present invention.

FIG. 2 is a flowchart illustrating the method of mobile VoIP phone communication of the present invention. As shown, in step S1, each mobile VoIP phone 100 is assigned an identification code to uniquely identify each mobile VoIP phone 100. The identification code may for example be a vehicle plate number, a telephone number of a mobile VoIP phone. Then, step S2 is proceeded.

In step S2, a registration process is preformed by the mobile VoIP phone 100 for login the mobile VoIP phone 100 into the local mobile VoIP server 200 it is currently in. Details of the various steps required for carrying out a registration process are discussed with reference to FIG. 3. Then, step S3 is proceeded.

In step S3, the current location is dynamically sent by the mobile VoIP phone 100 to the local mobile VoIP server 200 to which it current resides, so as to update the location of each mobile VoIP phone 100. Details of the various steps required for carrying out location update are discussed with reference to FIG. 4. Then, step S4 is executed.

In step S4, current processing status of the mobile VoIP phone 100 is determined. If the mobile VoIP phone 100 is in a dialing state, then step S5 is executed. Details of the various steps required for carrying out a dialing process are discussed with reference to FIG. 5. If the mobile VoIP phone 100 is in a call receiving state, then step S7 is executed. Details of the various steps required for carrying out a call receiving process are discussed with reference to FIG. 6. If the mobile VoIP phone 100 is in a state of transmitting a packet to another mobile VoIP phone 100, then step S9 is executed. Details of the various steps required for carrying out a data transmission are discussed with reference to FIG. 7.

Figure 3:
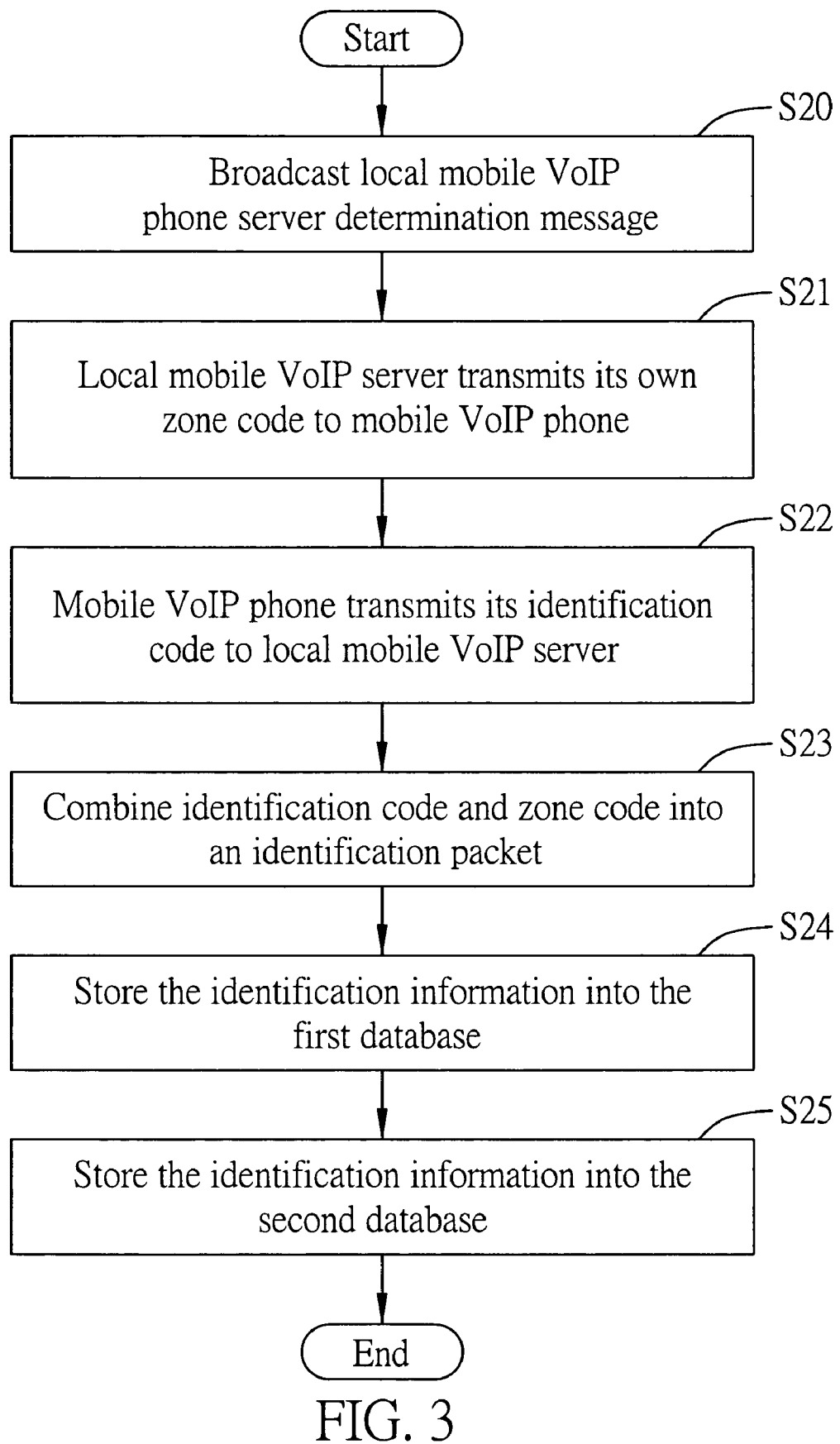
FIG. 3 is a flowchart illustrating the various steps required for carrying out a registration process of the mobile VoIP phone communication method of the present invention.

FIG. 3 is a flowchart illustrating the various steps required for carrying out a registration process of the mobile VoIP phone communication method of the present invention. As shown, step S20 is first executed, allowing the mobile VoIP phone 100 to execute the first wireless transceiver 120 that broadcasts a mobile local VoIP phone server determination message to seek a local mobile VoIP server 200. Then, step S21 is performed.

In step S21, when the local mobile VoIP server 200 closest to the mobile VoIP phone 100 receives the mobile local VoIP phone server determination message, it returns its own zone code to the mobile VoIP phone 100. Then, step S22 is performed.

In step S22, the mobile VoIP phone 100 transmits its identification code to the local mobile VoIP server 200. Then, step S23 is performed.

In step S23, the mobile VoIP phone 100 combines its own identification code and the zone code returned by the local mobile VoIP server 200 into an identification packet. Then, step S24 is performed.

In step S24, when the local mobile VoIP server 200 receives the identification code transmitted by the mobile VoIP phone 100, the local mobile VoIP server 200 combines the identification information such as the identification code and its own zone code (e.g. a data format with a vehicle plate number and a zone code) and stores the identification information into the first database 230. Then, step S25 is executed.

In step S25, the local mobile VoIP server 200 sends the identification information containing the identification code and the zone code for the mobile VoIP phone 100 to the central mobile VoIP server 300, so the local mobile VoIP server 200 and the central mobile VoIP server 300 both have record of this identification information.

Figure 4:
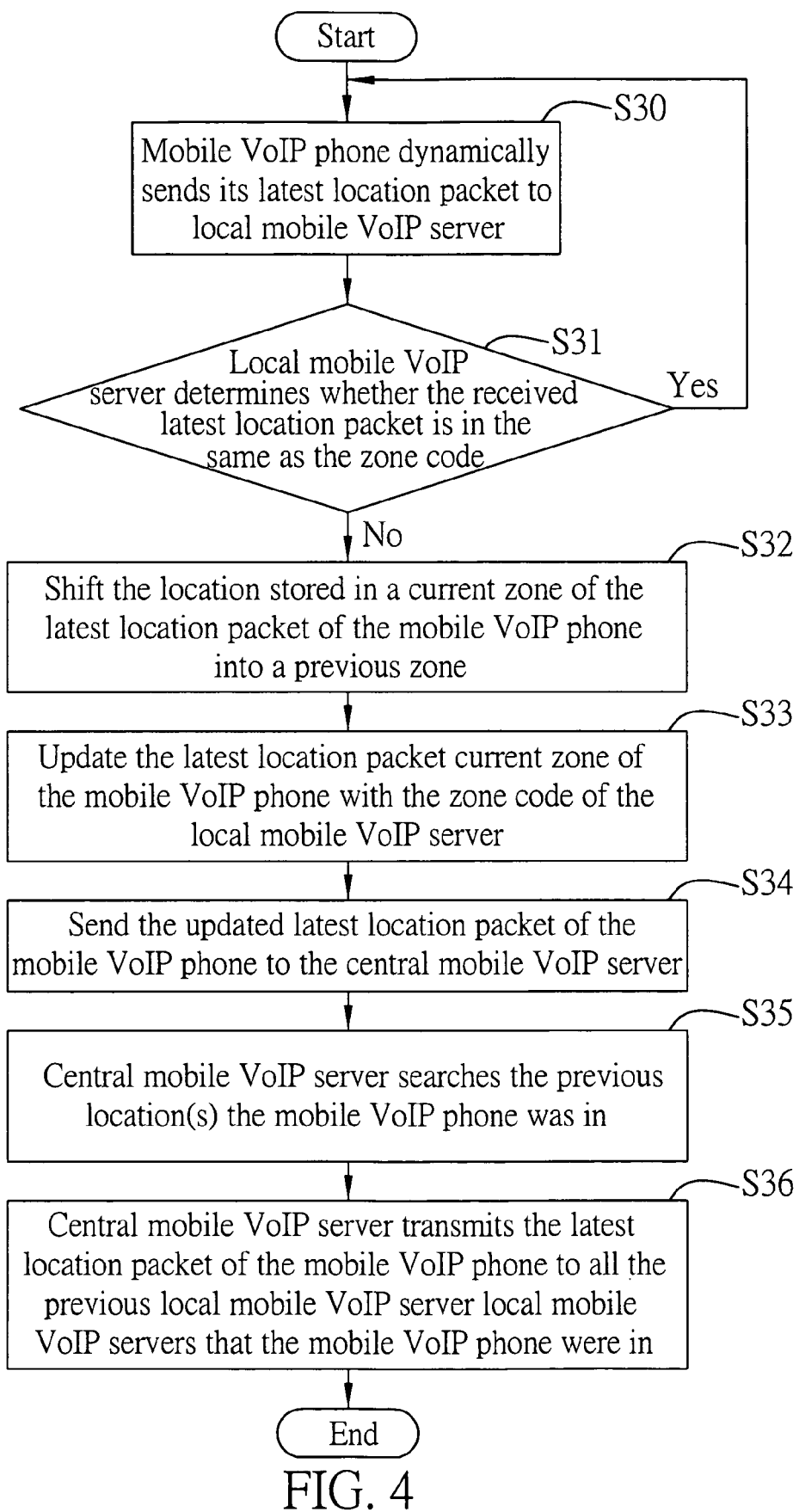
FIG. 4 is a flowchart illustrating the various steps required for carrying out a location update of the mobile VoIP phone communication method of the present invention.

FIG. 4 is a flowchart illustrating the various steps required for carrying out a location update of the mobile VoIP phone communication method of the present invention. As shown, in step S30, the mobile VoIP phone 100 sends its latest location packet to the local mobile VoIP server 200 to obtain the latest location information of the mobile VoIP phone 100. Then, step S31 is performed.

In step S31, when the local mobile VoIP server 200 receives the latest location packet of the mobile VoIP phone 100, it determines whether the received latest location packet is in the same as the zone code, if so, then step S30 is returned; else, step S32 is performed.

In step S32, the local mobile VoIP server 200 shifts the location stored in a current zone of the latest location packet of the mobile VoIP phone 100 into a previous zone thereof. Then step S33 is performed.

In step S33, the local mobile VoIP server 200 updates the latest location packet current zone of the mobile VoIP phone 100 with the zone code of the local mobile VoIP server 200. Then step S34 is performed.

In step S34, the local mobile VoIP server 200 sends the updated latest location packet of the mobile VoIP phone 100 to the central mobile VoIP server 300. Then, step S35 is executed.

In step S35, when the central mobile VoIP server 300 receives the updated latest location packet of the mobile VoIP phone 100, the previous location(s) the mobile VoIP phone 100 was in is searched by determining the location(s) recorded in the previous zone of the latest location packet. Then, step S36 is performed.

In step S36, after determining all the locations the mobile VoIP phone 100 previously in, the central mobile VoIP server 300 transmits the latest location packet of the mobile VoIP phone 100 to all the previous local mobile VoIP server local mobile VoIP servers 200 that the mobile VoIP phone 100 were in, such that the local mobile VoIP server local mobile VoIP servers 200 record the latest location of the mobile VoIP phone 100.

Figure 5:
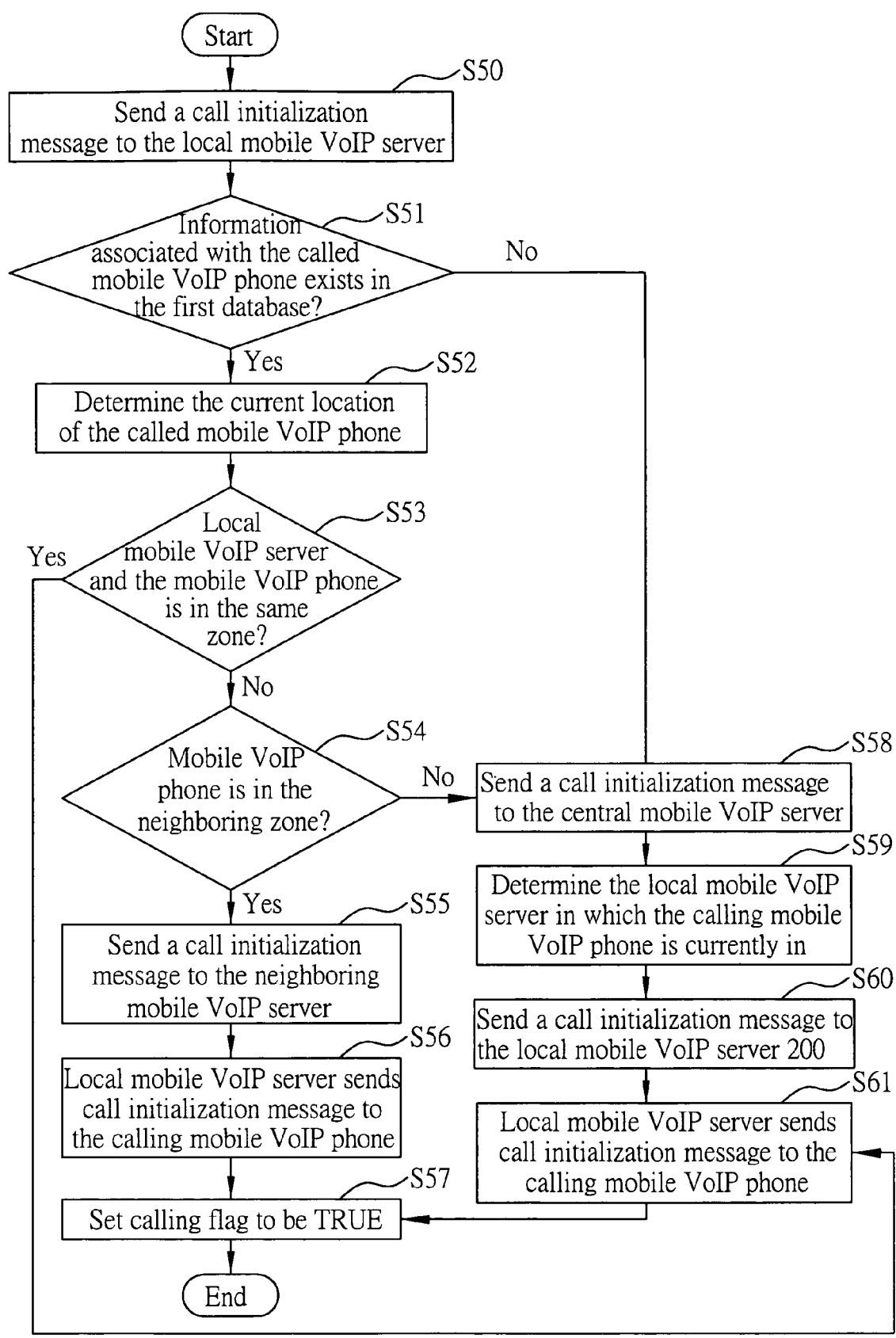
FIG. 5 is a flowchart illustrating the various steps required for carrying out a dialing process of the mobile VoIP phone communication method of the present invention.

FIG. 5 is a flowchart illustrating the various steps required for carrying out a dialing process of the mobile VoIP phone communication method of the present invention. As shown, step S50 is first executed, in which when the mobile VoIP phone 100 makes a call, it sends a call initialization message to the local mobile VoIP server 200 in which it resides, then step S51 is performed.

In step S51, when the local mobile VoIP server 200 receives the call initialization message, it determines whether the information associated with the calling mobile VoIP phone 100 exists in the first database 230 of the local mobile VoIP server 200. If the information exists in the first database 230, then step S52 is performed; else, step S58 is performed.

In step S52, the local mobile VoIP server 200 determines the current location of the mobile VoIP phone 100 by looking up the current zone of the latest location packet of the mobile VoIP phone 100 recorded in the first database 230. Then, step S5 is executed.

In step S53, the local mobile VoIP server 200 determines whether the calling mobile VoIP phone 100 is in the same zone as itself. If they are in the same zone, step S61 is executed; else step S54 is executed.

In step S54, the local mobile VoIP server 200 determines whether the calling mobile VoIP phone 100 is in the neighboring zone, if so, then step S55 is performed; else step S58 is executed.

In step S55, the local mobile VoIP server 200 sends a call initialization message to the neighboring mobile VoIP server (not shown herein). Then, step S5 is executed.

In step S56, the neighboring local mobile VoIP server 200 sends the call initialization message to the calling mobile VoIP phone 100. Then, step S57 is executed.

In step S57, the calling mobile VoIP phone 100 sets the calling flag to be TRUE, indicating that a calling session is started. Then, step S57 is executed.

In step S58, the local mobile VoIP server 200 sends a call initialization message to the central mobile VoIP server 300. Then, step S59 is executed.

In step S59, the central mobile VoIP server 300 determines the local mobile VoIP server 200 in which the calling mobile VoIP phone 100 is currently in by searching in information stored in the second database 320. Then, step S60 is executed.

In step S60, the central mobile VoIP server 300 sends a call initialization message to the local mobile VoIP server 200 in which the calling mobile VoIP phone 100 resides. Then, step S61 is executed.

In step S61, the local mobile VoIP server 200 sends the call initialization message to the calling mobile VoIP phone 100. Then, step S57 is executed.

Figure 6:
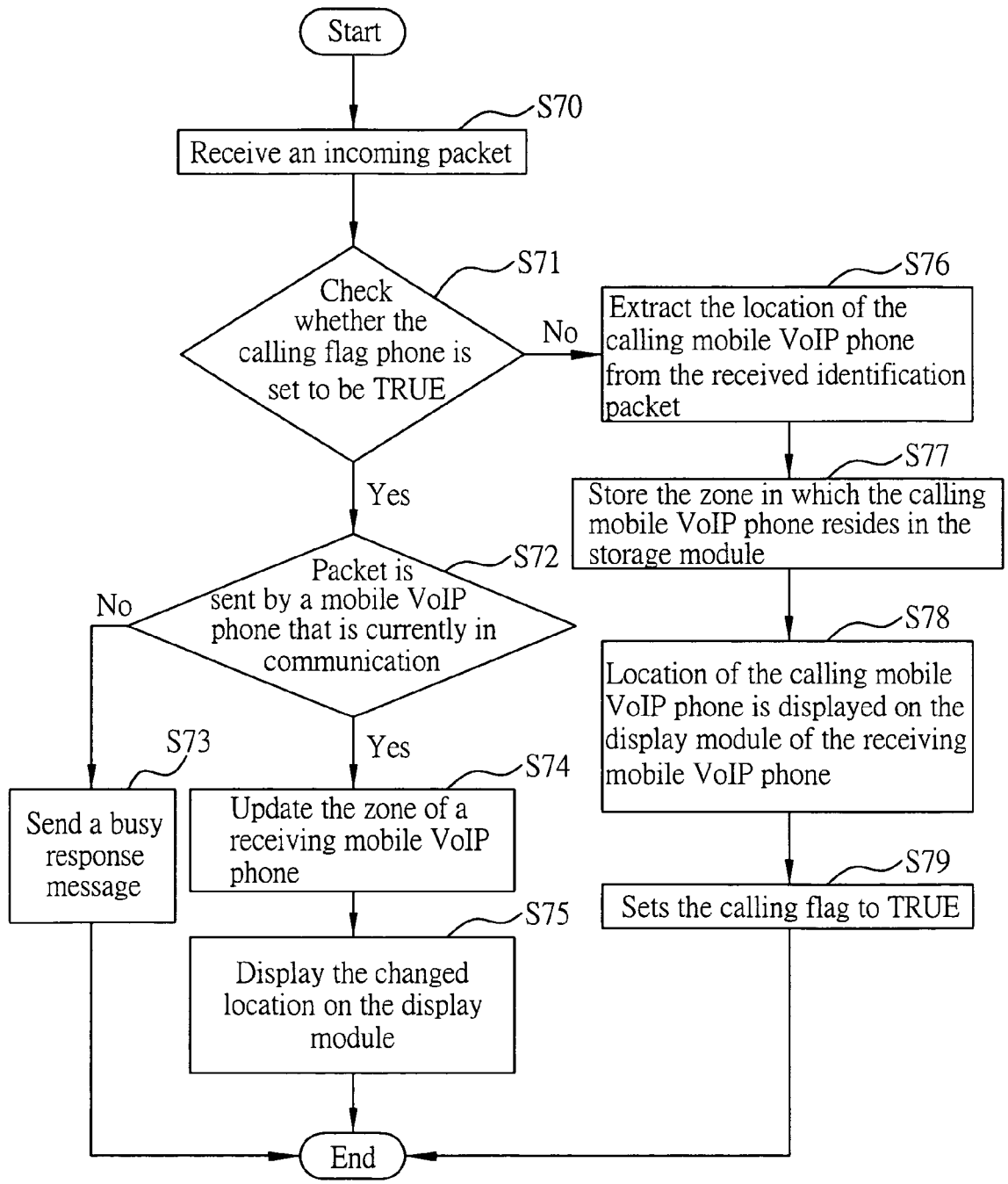
FIG. 6 is a flowchart illustrating the various steps required for carrying out a call receiving process of the mobile VoIP phone communication method of the present invention.

FIG. 6 is a flowchart illustrating the various steps required for carrying out a call receiving process of the mobile VoIP phone communication method of the present invention. As shown, first S70 is executed, in which the first wireless transceiver 120 of the mobile VoIP phone 100 receives an incoming packet. Then, step S71 is performed.

In step S71, the CPU 110 of the mobile VoIP phone 100 checks whether the calling flag of the mobile VoIP phone 100 is set to be TRUE so as to determine whether the mobile VoIP phone 100 is current in a calling session. If the value of the calling flag is TRUE, then step S72 is performed; else if the value of the calling flag is FALSE, step S76 is executed.

In step S72, when the calling flag is TRUE indicating the mobile VoIP phone 100 is in a calling session, the CPU 110 checks the identification code of the received packet to determine whether the packet is sent by a mobile VoIP phone 100 that is currently in communication with the mobile VoIP phone 100, if so, then step S73 is executed; else step S74 is executed.

In step S73, the mobile VoIP phone 100 sends a busy response message to inform the calling mobile VoIP phone 100 that it is currently busy.

In step S74, if the calling mobile VoIP phone 100 changes its location, the CPU 110 of the receiving mobile VoIP phone 100 updates the range of a receiving mobile VoIP phone zone that is received. Then, step S75 is executed.

In step S75, the display module 130 of the receiving mobile VoIP phone 100 displays the changed location of the calling mobile VoIP phone 100 to notify the user of the latest location of the calling mobile VoIP phone 100.

In step S76, if the calling flag is FALSE, indicating that the receiving mobile VoIP phone 100 received a call initialization message, thus the receiving mobile VoIP phone 100 extracts the location of the calling mobile VoIP phone 100 from the received identification packet. Then, step S77 is executed.

In step S77, the zone in which the calling mobile VoIP phone 100 is in is stored by the receiving mobile VoIP phone 100 in for example the storage module 140. Then, step S78 is executed.

In step S78, the location of the calling mobile VoIP phone 100 is displayed on the display module of the receiving mobile VoIP phone 100 so as to notify the user of the current location of the calling mobile VoIP phone 100. Then, step S79 is executed.

In step S79, the receiving mobile VoIP phone 100 sets its calling flag to TRUE.

Figure 7:
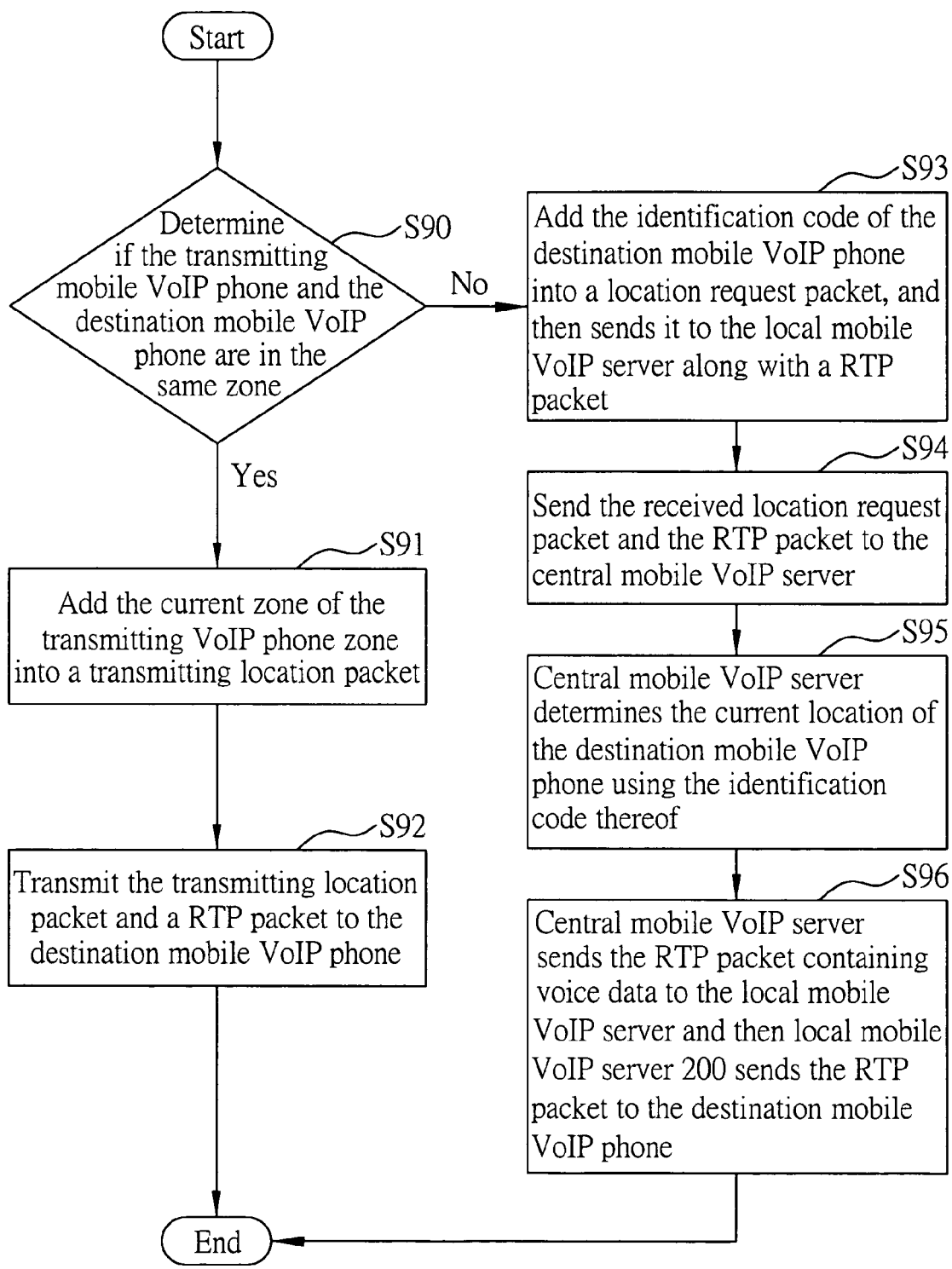
FIG. 7 is a flowchart illustrating the various steps required for carrying out a data transmission of the mobile VoIP phone communication method of the present invention.

FIG. 7 is a flowchart illustrating the various steps required for carrying out a data transmission of the mobile VoIP phone communication method of the present invention. As shown, first S90 is executed, in which, when the mobile VoIP phone 100 wishes to transmit a packet to another mobile VoIP phone 100 that is current in communication, the transmitting mobile VoIP phone 100 compares its own latest location packet and the zone of the destination mobile VoIP phone 100 to see if they are in the same zone, if so, then step S91 is performed; else step S93 is performed.

In step S91, the transmitting mobile VoIP phone 100 adds its transmitting VoIP phone zone into a transmitting location packet. Then, step S9 is performed.

In step S92, the transmitting mobile VoIP phone 100 transmits the transmitting location packet as well as a Run-Time Protocol (RTP) packet containing voice data to the destination mobile VoIP phone 100.

In step S93, the transmitting mobile VoIP phone 100 adds the identification code of the destination mobile VoIP phone 100 into a location request packet, and then sends it to the local mobile VoIP server 200 along with a RTP packet containing voice data. Then, step S94 is performed.

In step S94, the local mobile VoIP server 200 then sends the received location request packet and the RTP packet containing voice data to the central mobile VoIP server 300. Then, step S95 is performed.

In step S95, the central mobile VoIP server 300 determines the current location of the destination mobile VoIP phone 100 by looking up the identification code of the destination mobile VoIP phone 100 in the second database 320. Then, step S96 is performed.

In step S96, the central mobile VoIP server 300 sends the RTP packet containing voice data to the local mobile VoIP server 200 in which the destination mobile VoIP phone 100 currently resides. This local mobile VoIP server 200 then sends the RTP packet containing voice data to the destination mobile VoIP phone 100.

In summary, the mobile VoIP phone communication system and method of the present invention essentially assigns an identification code to each mobile VoIP phone and logins the phone into a local mobile VoIP server in which it is currently resides using the identification code based on abovementioned registration process. The mobile VoIP phone in a zone dynamically sends its current location to the local mobile VoIP server in that zone. When the location packet sent by the mobile VoIP phone is different from that of the local mobile VoIP server, the mobile VoIP phone then performs the location update process in order to dynamically update its location. Thereafter, the local mobile VoIP server sends the identification code of the updated mobile VoIP phone to the central mobile VoIP server. Thus, when a user wishes to make a call to this identification code, data transmission with the mobile VoIP phone with this identification code can be provided via the central mobile VoIP server and the local mobile VoIP server.

The above embodiments are only used to illustrate the principles of the present invention, and they should not be construed as to limit the present invention in any way. The above embodiments can be modified by those with ordinary skills in the arts without departing from the scope of the present invention as defined in the following appended claims.

What is claimed is:

1. A mobile Voice-over-Internet-Protocol (VoIP) phone communication system, comprising:
    at least a mobile VoIP phone that sends identification information via a network unit;
    at least a local mobile VoIP server located in a specific communication zone that establishes a network connection with the mobile VoIP phone via the network unit and identifies and records identification information of a mobile VoIP phone entering into the zone; and
    at least a central mobile VoIP server that establishes network communication with the local mobile VoIP server via the network unit to coordinate the local mobile VoIP server in each zone, and obtains identification information of all the mobile VoIP phones via the local mobile VoIP server in each zone so as to allow communication between various mobile VoIP phones,
    wherein the mobile VoIP phone further includes a dialing process, comprising the following steps of:
    (1) having mobile VoIP phone send a call initialization message to a local mobile VoIP server in the same zone;
    (2) having the local mobile VoIP server determine whether information about the calling mobile VoIP phone exists, wherein, if so, proceeding to step (3), and, otherwise, proceeding to step (4);
    (3) having the local mobile VoIP server determine the current location of the calling mobile VoIP phone by looking up the zone code contained in the recorded identification information corresponding to the calling mobile VoIP phone, and determine whether the calling mobile VoIP phone is in the same zone, wherein, if so, then proceeding to step (6), and otherwise, proceeding to step (4);
    (4) having the local mobile VoIP server send the call initialization message to the central mobile VoIP server;
    (5) having the central mobile VoIP server identify a local mobile VoIP server currently in the same zone with the calling mobile VoIP phone by looking up the recorded identification information of the calling mobile VoIP phone, and send the call initialization message to the identified local mobile VoIP server to achieve the purpose of the dialing process; and
    (6) having the local mobile VoIP server send the call initialization message to the identified local mobile VoIP server to achieve the purpose of the dialing process.

2. The mobile VoIP phone communication system of claim 1, wherein the mobile VoIP phone comprises:
    a registration module for login to the local mobile VoIP server in the specific communication zone to which the mobile VoIP phone is entering such that the local mobile VoIP server identifies and records the mobile VoIP phone entering into the zone; and
    a location updating module for recording the identification information of the mobile VoIP phone moving from a first specific communication zone to a second specific communication zone to the local mobile VoIP server in the second specific communication zone and recording a zone code contained in the identification information to the local mobile VoIP server in the first specific communication zone.

3. The mobile VoIP phone communication system of claim 1, wherein the local mobile VoIP server further includes a database for storing the identification information of the mobile VoIP phone entering into the specific communication zone of the local mobile VoIP server.

4. The mobile VoIP phone communication system of claim 3, wherein the identification information comprises an identification code of the mobile VoIP phone and a zone code of a zone in which it resides.

5. The mobile VoIP phone communication system of claim 4, wherein the identification code is one of a vehicle plate number and a phone number.

6. The mobile VoIP phone communication system of claim 1, wherein the mobile VoIP phone comprises:
    a receiving module for handling a communication packet received by the mobile VoIP phone;
    a transmitting module for handling a communication packet to be sent by the mobile VoIP phone; and
    a storage module for storing processing status of the receiving module and the transmitting module for allowing the local mobile VoIP server in the specific communication zone to identify the current status of the mobile VoIP phone in the zone.

7. The mobile VoIP phone communication system of claim 6, wherein the mobile VoIP phone sets a flag value according to the process status of the receiving module and the transmitting module and stores the flag value in the storage module.

8. The mobile VoIP phone communication system of claim 6, wherein the mobile VoIP phone further comprises a display module for displaying a location corresponding to a process status selected from one of a communication source location received by the receiving module and a communication packet destination location to be transmitted by the transmitting module.

9. The mobile VoIP phone communication system of claim 1, wherein the central mobile VoIP server further comprises a database for storing the identification information of various mobile VoIP phones.

10. The mobile VoIP phone communication system of claim 9, wherein the identification information includes an identification code of the mobile VoIP phone and a zone code of the zone in which it resides.

11. The mobile VoIP phone communication system of claim 1, wherein the local mobile VoIP server further comprises a calling module for performing a call initialization process that connects two mobile VoIP phones in a calling session.

12. A mobile Voice-over-Internet-Protocol (VoIP) phone communication method allowing users to make mobile communication via mobile VoIP phones, the method comprising the following steps of:
    establishing a local mobile VoIP server in at least one specific communication zone;
    establishing at least a central mobile VoIP server for coordinating with the local mobile VoIP server in each zone;
    allowing the mobile VoIP phone to login to the local mobile VoIP server in a specific communication zone to which the mobile VoIP phone enters, such that the local mobile VoIP server identifies the mobile VoIP server in the zone and stores identification information of the identified mobile VoIP phone, wherein, if the mobile VoIP phone is moving from a first specific communication zone to a second specific communication zone, the identification information of the mobile VoIP phone is recorded in the local mobile VoIP server in the second specific communication zone; and allowing the local mobile VoIP server to transmit the identification information to a central mobile VoIP server and the central mobile VoIP server storing the identification information, wherein the mobile VoIP phone further includes a dialing process, comprising the following steps of:

(1') having the mobile VoIP phone send a call initialization message to a local mobile VoIP server in the same zone;

(2') having the local mobile VoIP server determine whether information about the calling mobile VoIP phone exists, wherein, if so, proceeding to step (3'), and, otherwise, proceeding to step (4');

(3') having the local mobile VoIP server determine the current location of the calling mobile VoIP phone by looking up a zone code contained in the recorded identification information corresponding to the calling mobile VoIP phone, and determine whether the calling mobile VoIP phone is in the same zone, wherein, if so, then proceeding to step (6'), and otherwise, proceeding to step (4');

(4') having the local mobile VoIP server send the call initialization message to the central mobile VoIP server;

(5') having the central mobile VoIP server identify a local mobile VoIP server currently in the same zone with the calling mobile VoIP phone by looking up the recorded identification information of the calling mobile VoIP phone, and send the call initialization message to the identified local mobile VoIP server to achieve the purpose of the dialing process; and (6') having the local mobile VoIP server send the call initialization message to the identified local mobile VoIP server to achieve the purpose of the dialing process.

13. The mobile VoIP phone communication method of claim 12, wherein the identification information of the mobile VoIP phone further comprises an identification code of the mobile VoIP phone.

14. The mobile VoIP phone communication method of claim 13, wherein if the mobile VoIP phone moving from a first specific communication zone to a second specific communication zone and the identification information of the mobile VoIP phone being recorded in the local mobile VoIP server in the second specific communication zone, a zone code contained in the identification information is recorded into the local mobile VoIP server in the first specific communication zone.

15. The mobile VoIP phone communication method of claim 13, wherein the mobile VoIP phone further includes a call receiving process, comprising the following steps of:

(1) when the mobile VoIP phone receiving an incoming packet, checking the communication status of the receiving mobile VoIP phone, and if the receiving mobile VoIP phone being in a busy status, then proceeding to step (2); else proceeding to step (5);

(2) determining whether the packet is transmitted by a calling mobile VoIP phone that is currently causing the receiving mobile VoIP phone in the busy status, if not, then proceed to step (3); else, proceeding to step (4);

(3) sending a busy response message from the receiving mobile VoIP phone to the packet sender to inhibit packet transmission to the receiving mobile VoIP phone;

(4) having the receiving mobile VoIP phone in the busy status respond to the calling mobile VoIP phone, and wherein, if the calling mobile VoIP phone changes its location, the receiving mobile VoIP phone updates the zone code contained in the identification information of the calling mobile VoIP phone received in order to establish communication between the two connected mobile VoIP phones, thereby achieving call receiving purpose; and (5) having the receiving mobile VoIP phone extract the current zone in which the calling mobile VoIP phone resides from the received identification information in order to establish communication between the two mobile VoIP phones, thereby achieving call receiving purpose.

16. The mobile VoIP phone communication method of claim 15, wherein the above step (4) and step (5) further including displaying a location of the calling mobile VoIP phone on a display module of the receiving mobile VoIP phone.

17. The mobile VoIP phone communication method of claim 13, wherein the mobile VoIP phone further comprises a data transmission process, and the data transmission referring to a transmitting mobile VoIP phone transmitting a packet to a destination mobile VoIP phone in communication, the data transmission comprising the following steps of:

(1) having the transmitting mobile VoIP phone compare the zone code of the transmitting mobile VoIP phone with that of the destination mobile VoIP phone to determine whether the transmitting mobile VoIP phone and the destination mobile VoIP phone are in the same zone, if so, proceeding to step (2); else, proceeding to step (3);

(2) having the transmitting mobile VoIP phone add the zone code into a transmitting location packet and send it to the destination mobile VoIP phone along with a Run-Time Protocol (RTP) packet, thereby achieving the purpose of the data transmission process;

(3) having the transmitting mobile VoIP phone add an identification code of the destination mobile VoIP phone to a location request packet and send it to the local mobile VoIP server along with a RTP packet;

(4) having the local mobile VoIP server transmit the received location request packet and the RTP packet to the central mobile VoIP server; and (5) having the central mobile VoIP server determine the zone code of the destination mobile VoIP phone according to the identification information of the destination mobile VoIP phone, and then send the RTP packet to the local mobile VoIP server in a zone corresponding to the determined zone code of the destination mobile VoIP phone, and then having the local mobile VoIP server transmit the RTP packet to the destination mobile VoIP phone.

18. The mobile VoIP phone communication method of claim 13, wherein the identification code is one of a vehicle plate number and a phone number.

19. The mobile VoIP phone communication method of claim 17, wherein the RTP packet comprises voice data.

20. A mobile Voice-over-Internet-Protocol (VoIP) phone communication method allowing users to effect mobile communication via mobile VoIP phones, the method comprising the following steps of:

establishing a local mobile VoIP server in at least one specific communication zone;

establishing at least a central mobile VoIP server for coordinating the local mobile VoIP server in each zone;

allowing the mobile VoIP phone to login to the local mobile VoIP server in a specific communication zone to which the mobile VoIP phone enters, such that the local mobile VoIP server identifies the mobile VoIP server in the zone and stores identification information of the identified mobile VoIP phone, wherein, if the mobile VoIP phone is moving from a first specific communication zone to a second specific communication zone, the identification information of the mobile VoIP phone is recorded in the local mobile VoIP server in the second specific communication zone; and allowing the local mobile VoIP server to transmit the identification information to a central mobile VoIP server and the central mobile VoIP server storing the identification information, wherein the mobile VoIP phone further includes a call receiving process, comprising the following steps of:
  (1) when the mobile VoIP phone receives an incoming packet, checking the communication status of the receiving mobile VoIP phone, and if the receiving mobile VoIP phone is in a busy status, then proceeding to step (2); else proceeding to step (5);
  (2) determining whether the packet is transmitted by a calling mobile VoIP phone that is currently causing the receiving mobile VoIP phone to be in the busy status, wherein, if not, then proceed to step (3); else, proceed to step (4);
  (3) sending a busy response message from the receiving mobile VoIP phone to the packet sender to inhibit packet transmission to the receiving mobile VoIP phone;
  (4) the receiving mobile VoIP phone in the busy status responding to the calling mobile VoIP phone, wherein, if the calling mobile VoIP phone changes its location, the receiving mobile VoIP phone updates a zone code contained in the identification information of the calling mobile VoIP phone received in order to establish communication between the two connected mobile VoIP phones, thereby achieving a call receiving purpose; and
  (5) the receiving mobile VoIP phone extracting the current zone in which the calling mobile VoIP phone resides from the received identification information in order to establish communication between the two mobile VoIP phones, thereby achieving a call receiving purpose.

21. A mobile Voice-over-Internet-Protocol (VoIP) phone communication method allowing users to make mobile communication via mobile VoIP phones, the method comprising the following steps of:

establishing a local mobile VoIP server in at least one specific communication zone;

establishing at least a central mobile VoIP server for coordinating with the local mobile VoIP server in each zone;

allowing the mobile VoIP phone to login to the local mobile VoIP server in a specific communication zone to which the mobile VoIP phone enters, such that the local mobile VoIP server identifies the mobile VoIP server in the zone and stores identification information of the identified mobile VoIP phone, wherein, if the mobile VoIP phone is moving from a first specific communication zone to a second specific communication zone, the identification information of the mobile VoIP phone is recorded in the local mobile VoIP server in the second specific communication zone; and allowing the local mobile VoIP server to transmit the identification information to a central mobile VoIP server and the central mobile VoIP server storing the identification information, wherein the mobile VoIP phone further comprises a data transmission process, the data transmission referring to a transmitting mobile VoIP phone transmitting a packet to a destination mobile VoIP phone in communication, the data transmission comprising the following steps of:
  (1) having the transmitting mobile VoIP phone compare a zone code of the transmitting mobile VoIP phone with that of the destination mobile VoIP phone to determine whether the transmit mobile VoIP phone and the destination mobile VoIP phone are in the same zone, wherein, if so, proceeding to step (2), and, otherwise, proceeding to step (3);
  (2) having the transmitting mobile VoIP phone add the zone code into a transmitting location packet and send it to the destination mobile VoIP phone along with a Run-Time Protocol (RTP) packet, thereby achieving the purpose of the data transmission process;
  (3) having the transmitting mobile VoIP phone add an identification code of the destination mobile VoIP phone to a location request packet and send it to the local mobile VoIP server along with a RTP packet;
  (4) having the local mobile VoIP server transmit the received location request packet and the RTP packet to the central mobile VoIP server; and
  (5) having the central mobile VoIP server determine the zone code of the destination mobile VoIP phone according to the identification information of the destination mobile VoIP phone, and then send the RTP packet to the local mobile VoIP server in a zone corresponding to the determined zone code of the destination mobile VoIP phone, and then having the local mobile VoIP server transmit the RTP packet to the destination mobile VoIP phone.

22. A mobile Voice-over-Internet-Protocol (VoIP) phone communication system, comprising:

at least a mobile VoIP phone that sends identification information via a network unit;

at least a local mobile VoIP server located in a specific communication zone that establishes a network connection with the mobile VoIP phone via the network unit and identifies and records identification information of a mobile VoIP phone entering into the zone; and at least a central mobile VoIP server that establishes network communication with the local mobile VoIP server via the network unit to coordinate with the local mobile VoIP server in each zone, and obtains identification information of all the mobile VoIP phones via the local mobile VoIP server in each zone so as to allow communication between various mobile VoIP phones, wherein the mobile VoIP phone further includes a call receiving process, comprising the following steps of:
  (1) when the mobile VoIP phone receives an incoming packet, checking the communication status of the receiving mobile VoIP phone, and, if the receiving mobile VoIP phone is in a busy status, then proceeding to step (2); else proceeding to step (5);
  (2) determining whether the packet is transmitted by a calling mobile VoIP phone that is currently causing the receiving mobile VoIP phone to be in the busy status, wherein, if not, then proceed to step (3); else, proceed to step (4);

(3) sending a busy response message from the receiving mobile VoIP phone to the packet sender to inhibit packet transmission to the receiving mobile VoIP phone;

(4) the receiving mobile VoIP phone in the busy status responding to the calling mobile VoIP phone, wherein, if the calling mobile VoIP phone changes its location, the receiving mobile VoIP phone updates the zone code contained in the identification information of the calling mobile VoIP phone received in order to establish communication between the two connected mobile VoIP phones, thereby achieving a call receiving purpose; and (5) the receiving mobile VoIP phone extracting the current zone in which the calling mobile VoIP phone resides from the received identification information in order to establish communication between the two mobile VoIP phones, thereby achieving a call receiving purpose.

23. A mobile Voice-over-Internet-Protocol (VoIP) phone communication system, comprising:

at least a mobile VoIP phone that sends identification information via a network unit;

at least a local mobile VoIP server located in a specific communication zone that establishes a network connection with the mobile VoIP phone via the network unit and identifies and records identification information of a mobile VoIP phone entering into the zone; and at least a central mobile VoIP server that establishes network communication with the local mobile VoIP server via the network unit to coordinate with the local mobile VoIP server in each zone, and obtains identification information of all the mobile VoIP phones via the local mobile VoIP server in each zone so as to allow communication between various mobile VoIP phones, wherein the mobile VoIP phone further comprises a data transmission process, the data transmission referring to a transmitting mobile VoIP phone transmitting a packet to a destination mobile VoIP phone in communication, the data transmission comprising the following steps of:

(1) having the transmitting mobile VoIP phone compare a zone code of the transmitting mobile VoIP phone with that of the destination mobile VoIP phone to determine whether the transmitting mobile VoIP phone and the destination mobile VoIP phone are in the same zone, wherein, if so, proceeding to step (2), and, otherwise, proceeding to step (3);

(2) having the transmitting mobile VoIP phone add the zone code into a transmitting location packet and send it to the destination mobile VoIP phone along with a Run-Time Protocol (RTP) packet, thereby achieving the purpose of the data transmission process;

(3) having the transmitting mobile VoIP phone add an identification code of the destination mobile VoIP phone to a location request packet and send it to the local mobile VoIP server along with a RTP packet;

(4) having the local mobile VoIP server transmit the received location request packet and the RTP packet to the central mobile VoIP server; and (5) having the central mobile VoIP server determine the zone code of the destination mobile VoIP phone according to the identification information of the destination mobile VoIP phone, and then send the RTP packet to the local mobile VoIP server in a zone corresponding to the determined zone code of the destination mobile VoIP phone, and then having the local mobile VoIP server transmit the RTP packet to the destination mobile VoIP phone.

* * * * *